Inventor
Arnold P. Hultgren
by Bair, Freeman & Molinare
Attys.

Oct. 16, 1956 A. P. HULTGREN 2,766,947

REEL CONSTRUCTION

Filed March 15, 1954 2 Sheets-Sheet 2

Inventor
Arnold P. Hultgren
by Bair, Freeman & Molinare
Attys.

2,766,947

REEL CONSTRUCTION

Arnold P. Hultgren, River Forest, Ill., assignor to American Molded Products Co., Chicago, Ill., a corporation of Illinois Application March 15, 1954, Serial No. 416,105
4 Claims. (Cl. 242—70)

This invention relates generally to a reel construction, and more particularly to a reel for winding thereon continuous ribbon-like materials, such as film or tape. This invention is based upon and constitutes a continuation-in-part of my co-pending application, Serial No. 399,391, filed December 21, 1953, now abandoned, some of the claims of the present application having been heretofore allowed in said co-pending application.

The efficient use of such devices as a part of film projectors and tape recorders necessitates reel winding in both directions of rotation of a single reel construction. The provision of a reel capable of performing a satisfactory winding operation in either direction of rotation presents certain problems with respect to the introduction of the film or tape into the reel for anchorage of one end thereof for initiating winding.

The conventional reel constructions of the prior art have customarily employed a transverse slot, extending axially of the reel hub, between the flange faces thereof, at right angles to the direction of winding. In such arrangements, the film or tape is introduced between the reel flanges, and the end thereof is projected through the transverse slot into the interior of the hub. The end portion of the film or tape must then be held adjacent the slot, and against the curved periphery of the outer hub surface until more than one full revolution of the reel is completed. This manner of holding the film or tape downwardly upon the reel hub, between the flanges, is difficult, awkward, and frequently ineffective to accomplish the starting operation. Often, slippage occurs just prior to completion of the first winding revolution, and, as the operator's hold is released to permit the film or tape to pass over the transverse slot to provide a second layer of material over that wound about the hub by the first revolution, the starting end of the material is pulled from the slot, and the entire operation must be repeated until the proper anchorage of film or tape on the hub is attained.

A further problem, relating to efficient reel winding of ribbon-like materials, is introduced by certain operating characteristics of tape recording units. In such devices, the reel is placed upon a turntable and a first recording is applied to the magnetic recording tape as the reel is rotated in a first given direction. It is the customary procedure that only slightly less than one-half the width of the tape is utilized during such recording. The reel is then turned over and a second recording is applied, while rotating the reel in the other direction, to the area of the other half portion of the tape. In such operations, it is necessary to provide means for initiating starting of the reel winding which is operative not only for both directions of reel rotation, but which is also arranged so as to permit effective use regardless of the side of the reel to which access may be limited because of the turntable.

It is a primary object of the present invention, therefore, to provide a reel construction having means for initiating reel winding of ribbon-like materials, whereby the starting end of the material may be quickly and easily placed in anchoring relation to the hub of the reel, and be securely held in place throughout the first full revolutions of the reel.

It is another object of the present invention to provide a reel construction having novel means for initiating reel winding in either direction of rotation of the reel.

It is a further object of the present invention to provide a reel construction having novel means for initiating reel winding, said means being operable to afford access from either face side of the reel and in either direction of rotation thereof.

It is still another object of the present invention to provide a reel construction having novel means for initiating reel winding, said means comprising two pairs of oppositely arranged V-shape, transverse slots extending through the reel hub and peripherally spaced from each other and extending transversely between the reel face flanges; said pairs of V-shaped slots terminating respectively in radial slots, extending through opposite face flanges of the reel.

It is still a further object of the present invention to provide improvements in the construction of reels having means for initiating reel winding operable to afford access from either face side of the reel and in either direction of rotation thereof, wherein said improvements facilitate the introduction of the starting end of the material to be wound for all cases of orientation of the reel on a turntable or the like.

With these and other objects in view, my invention consists in the construction, arrangement and combination of the various parts of my reel construction whereby the objects contemplated are obtained as hereinafter more fully set forth, pointed out in my claims and illustrated in the accompanying drawing, wherein:

Figure 4:
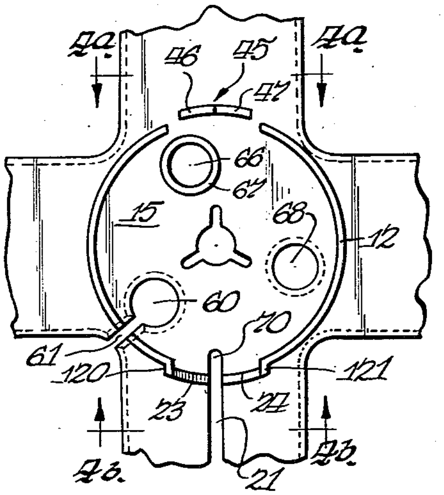
Figure 4 is a fragmentary view in side elevation showing one of the hub elements of the reel assembly of Figure 1.
Figures 4A, 4B, 5A, 5B:
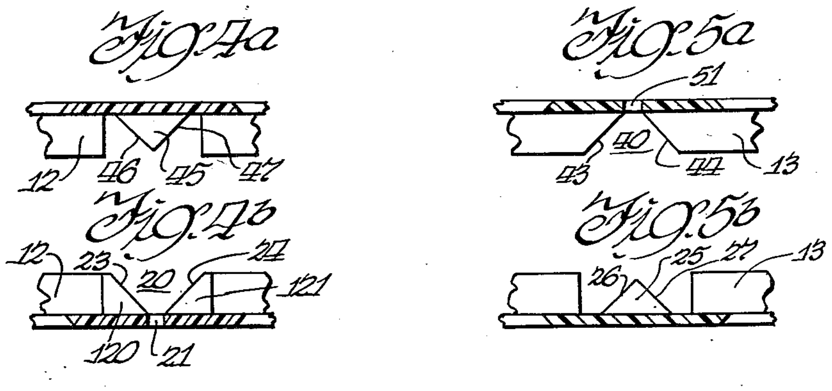

Figures 4*a* and 4*b* are cross sectional views taken along the lines 4*a*—4*a* and 4*b*—4*b*, respectively, of Figure 4.

Figure 5:
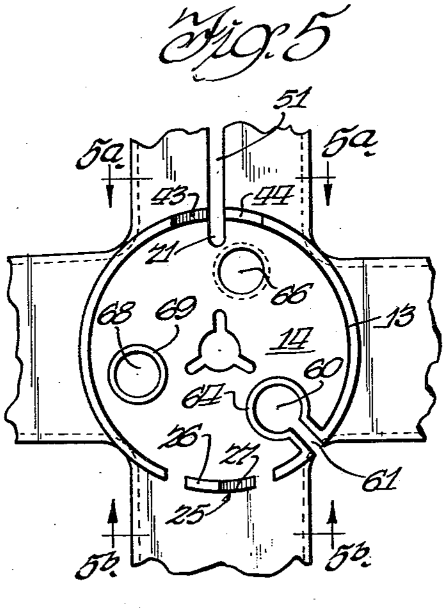
Figure 5 is another fragmentary view in side elevation, showing the other of the hub elements of the reel assembly of Figure 1.

Figures 5*a* and 5*b* are cross sectional views taken along the lines 5*a*—5*a* and 5*b*—5*b*, respectively, of Figure 5.

Figures 1, 2, 3:
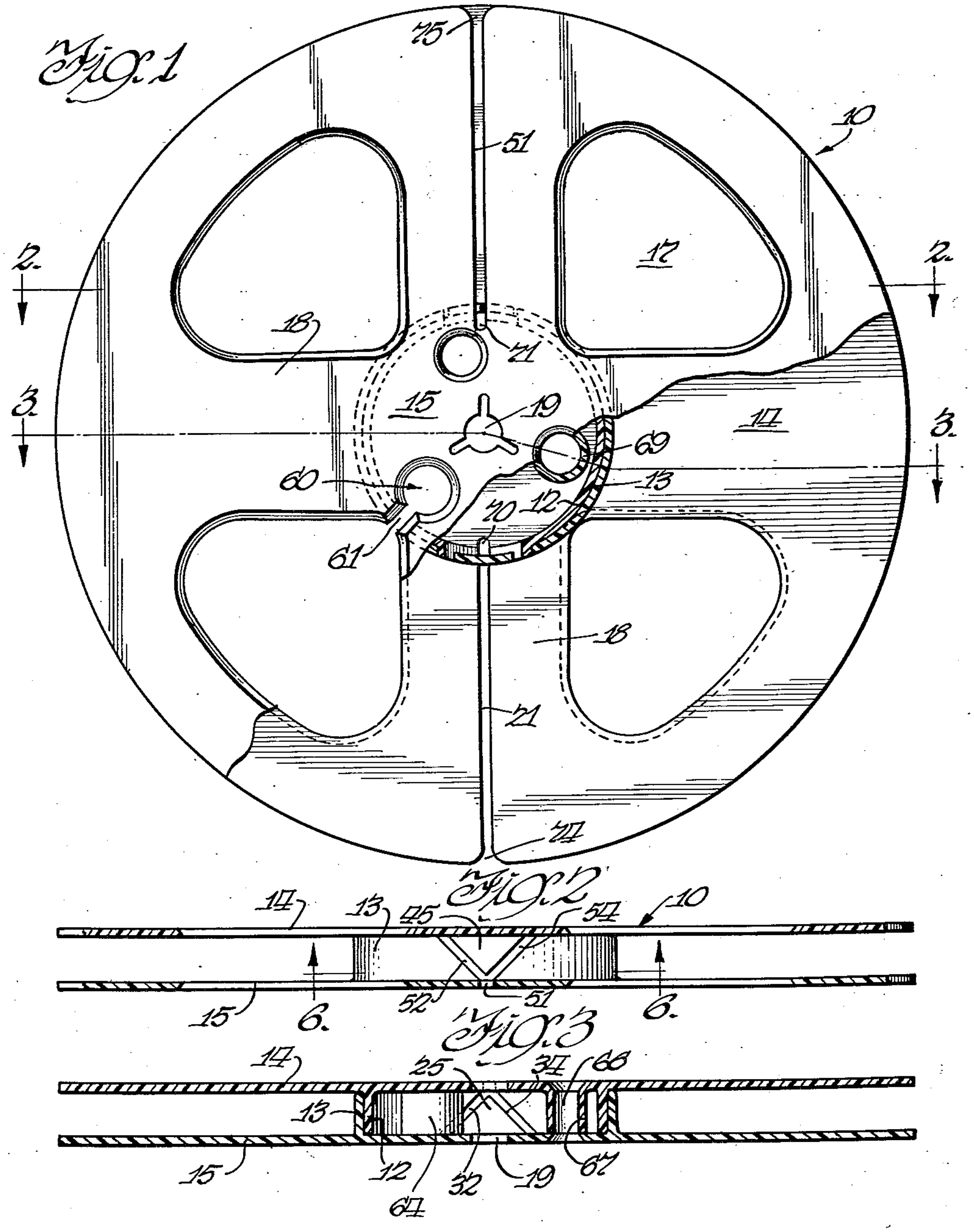
Figure 1 is a side elevational view, partly broken away, showing a reel constructed in accordance with the present invention.
Figure 2 is a cross sectional view of the reel taken as indicated at line 2—2 on Figure 1.
Figure 3 is another cross sectional view of the reel taken as indicated at line 3—3 on Figure 1.
Figure 6:
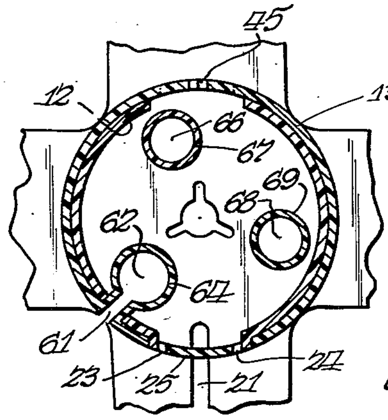

Figure 6 is a fragmentary cross sectional view taken as indicated at line 6—6 on Figure 2.

In Figure 1 of the drawing I have illustrated a real assembly, indicated generally at 10, constructed in accordance with the present invention. The reel comprises two cylindrical hubs 12 and 13 cooperatively engaged in telescoping relation to form a concentric assembly having coinciding longitudinal axes. As shown by the cut-away portion of Figure 1, the hub 12 is slightly smaller in diameter than the hub 13 so as to permit concentric positioning of the small diameter hub within the large diameter hub.

The hubs 12 and 13 are each provided with a substantially circular face flange at one end thereof, as indicated at 15 and 14, respectively. The plane surfaces of the face flanges 14 and 15 are substantially at right angles to the longitudinal axes of the respective hubs 13 and 12. In this manner, the face flanges 14 and 15 are positioned in spaced, parallel relation when the hubs 12 and 13 are assembled in concentric telescoping engagement.

The elements of the reel construction of the present invention are preferably, but not necessarily, made of a suitable low-cost non-metallic material, such as plastic. The hubs and their attached face flanges may be molded as separate integral half-portions for bonded assembly into final form by the application of a solvent or adhesive to the interfaces between the concentric hubs 12 and 13.

Each of the face flanges 14 and 15 is provided with a pattern of cut-away portions, as at 17, to form a ribbed flange of conventional spoked configuration. In this manner, a plurality of circumferentially spaced radial arms are provided, as indicated at 18 in Figure 1.

As best seen in Figures 4 to 6 of the drawing, I have provided an arrangement of cooperating elements forming a V-shaped slotted opening extending through the hubs and transversely between the face flanges of the assembled construction. The large diameter hub 13 is provided with a V-shaped projection 25 having inclined edges 26 and 27 arranged at an angle of about 45° with respect to the plane of the face flange 14. The V-shaped projection 25 is formed by notches or cut-away portions in the peripheral surface of the hub 13. As clearly shown in Figure 5, the projection 25 lies within the same curved surface as the general outer periphery of the hub 13. The small diameter hub 12 is provided with radially outwardly offset portions 120 and 121, which form a V-shaped notch 20. The notch 20 terminates at its apex in a radial slot 21, which will be hereinafter described in greater detail. The inclined edges 23 and 24 of the cut-away forming offsets 120 and 121 of notch 20 are at an angle of about 45° with respect to the plane of the face flange 15.

It will be apparent that in this manner the cut-away forming offsets 120 and 121 of the small diameter hub 12 and the projection 25 of the large diameter hub 13 lie within the surface of the same uniformly curved outer hub periphery when the two hubs are concentrically positioned in assembled relation, thereby providing a V-shape opening through the continuous uniform outer surface of the reel hub. This opening comprises slots 32 and 34, as clearly indicated in Figure 3, which intersect and terminate at their apex at the radial slot 21 in the hub 14.

The slots 32 and 34 extend transversely between the face flanges 14 and 15. Each of the slots transects an angle of about 45° with respect to the longitudinal axes of the concentric hubs, thereby forming an included angle of about 90° therebetween. The large diameter hub 13 is provided, diametrically opposite the projection 25 with a V-shaped notch 40 formed by a cut-away portion of the hub 13. The small diameter hub 12 is provided with radially outwardly offset V-shaped projection 45. The inclined edges 43 and 44 of the notch 40, and the inclined edges 46 and 47 of the projection 45, are inclined at an angle of about 45°. The projection 45 and the notch 40 cooperate in the same manner as the projection 25 and notch 20 to provide a V-shaped opening comprising slots 52 and 54, positioned diametrically opposite the V-shaped opening comprising slots 32 and 34, and extending through the continuously uniform outer surface of the reel hub, as best seen in Figure 2. The pair of slots 52 and 54 intersect and terminate at their apex at a radial slot 51, substantially the same as the slot 21.

In this manner it will be apparent that the assembled reel construction is provided with a novel V-shaped opening, comprising a pair of slots which intersect and terminate at the apex thereof in a radial slot extending through the surface of one of the reel flanges. As illustrated in Figure 1, this construction provides a slotted means for threading the starting end of a continuous ribbon of tape or the like through the outer periphery of the reel hub and outwardly against one of the side or face flanges thereof. An operator may, either manually or by some other suitable holding means, fix the starting end of the tape to be wound on the reel against the surface of the face flange without in any way interfering with the peripheral surface of the hub. The tape may be thus readily held, without in any way obstructing or contacting the tape to be wound on the hub, while several initial revolutions of the reel are completed, thereby permitting a simple, efficient, and reliable initiation of winding of the tape on the reel.

By providing a pair of slots, so as to form V-shaped openings, the material to be wound on the reel may be introduced from either direction so as to permit the novel slot of the present invention to be employed for initiating reel winding in either rotative direction. In certain applications, as heretofore indicated, the reel is first rotated in one direction and then reversed for rotation in the other direction. For certain uses, the reel normally has one of its face flanges resting upon or against a turntable, thereby permitting access to only the exposed face flange. Accordingly, therefore, I provide two pairs or sets of V-shaped openings in the reel hub. Preferably, the two sets are peripherally displaced about the circumference of the hub a suitable distance, and are shown in diametrically opposed relation for purposes of illustration. In this manner, the slots of the present invention may be employed to initiate the winding operation from either exposed face flange of the reel.

I have provided an axial bore or opening 60 which extends transversely between the reel face flanges and inwardly through the reel hub. Each of the face flanges 14 and 15 and their corresponding hubs are formed with a radial slot 61, which terminates at its one end in the axial bore 60, and at its other end opens outwardly through the peripheral surface of the hub into the cut-away portion 17 between adjacent arms 18 of the face flanges.

The opening 60 permits a number of reels to be positioned in adjacent relation on a single rotating shaft extending through the central axial bores 19 thereof, while the starting ends of the respective reel tapes are held in position by a holding bar extending through the aligned openings 60 thereof, for simultaneous winding in the manner described in detail in the aforesaid co-pending Tellen application.

I have also provided axial bores or openings 66 and 68 which extend transversely between the reel face flanges, and are bounded by perimeter flanges 67 and 69, respectively. The openings 66 and 68 provide engaging means for the use of a driving clutch, which is customarily employed in cooperation with the opening 60 during simultaneous initial winding of a plurality of adjacent aligned reels. The openings 66 and 68 also provide engaging means for the driving pins of various types of reel turntables.

Another feature of the present invention is directed to the provision of the slots 21 and 51. Each of the slots communicates with the apex of respective, diametrically opposite, V-shaped openings in opposite face flanges of the reel hub. Slot 21 communicates with slots 32 and 34, and slot 51 with slots 52 and 54. The slots 21 and 51 extend radially inwardly from their points of communication with the slots of the V-shaped openings to provide inner terminal ends 70 and 71, respectively. The slots 21 and 51 extend radially outwardly from the terminal ends 70 and 71 to the periphery of the respective face flanges 14 and 15 to provide outer terminal openings 74 and 75.

In use, either face flange of the reel assembly may be placed upon a drive turntable. Irrespective of which of the two face flanges is positioned in contacting engagement with the drive mechanism of the turntable, the exposed outer face flange will present a radial slot communicating with a cooperating V-shaped opening in the hub periphery. The free end of a length of tape may be passed through the radial slot and inserted into a slot of the V-shaped opening communicating with the terminal end thereof. In this manner, the starting end of a length of tape may be threaded radially inwardly through the hub periphery and axially outwardly through the exposed face flange so as to permit the free end of the tape to project from the reel face flange at a point closely adjacent the terminal end of the radial slot therein.

The length of tape extending continuously from the starting end may then be passed between the face flanges of the reel in the direction of winding, away from the radial slot.

The radial slots thereby provide an easy and efficient means for facilitating the use of the V-shaped slots, when the reel is positioned upon a turntable, by direct approach from the exposed face flange. Difficult edge-threading, laterally through the closely adjacent face flanges of the reel, is avoided. In this manner, the radial slots of the present invention permit the starting end of the tape to be readily introduced into the reel for threading through a slot of the cooperating V-shaped hub openings. The novel combination of radial slot and V-shaped hub opening enables the starting end of the tape to be easily threaded through the reel and manually held against the central portion of the exposed face flange during the initial winding revolutions.

Although the V-shaped openings and the cooperating radial slots have been shown as being located intermediate the width of corresponding flange spokes, it will be understood that the face flanges may also be formed so as to dispose the V-shaped openings adjacent the inner edge of a cut-out portion of the face flange. In such an arrangement, the radial slot 21 would be retained, but the radial slot 51 would be omitted, as embodied in the construction disclosed in my said co-pending application.

Changes may be made in the construction and arrangement of the parts of my reel construction without departing from the real spirit and purpose of my invention, and it is my intention to cover by my claims any modified forms of structure or use of mechanical improvements which may be reasonably included within their scope.

I claim as my invention:

1. A reel construction comprising a pair of hollow cylindrical hubs telescoped in closely adjacent concentric relation one within the other, said hubs having face flanges positioned at opposite ends thereof, the cylindrical telescoped portions of said hubs being rigidly bonded together to provide an integral assembly, each of said hubs having a cut-away portion opening outwardly at the ends thereof opposite said face flanges, one of said cut-away portions being in the form of a V-shaped opening and the other being in the form of a V-shaped projection with adjacent open spaces, said cut-away portions being in superposed alignment to define a pair of intersecting inclined slots extending through the hubs transversely between said flanges and forming a V-shaped opening, said V-shaped opening transecting angles of about 45° with respect to the longitudinal axis of said hubs and forming an included angle of about 90° therebetween, the apex of said V-shaped opening terminating in a radial slot extending through the surface of one of said face flanges.

2. A reel construction formed of moldable plastic material and comprising a pair of hollow cylindrical hubs telescoped in closely adjacent concentric relation one within the other, said hubs having face flanges positioned at opposite ends thereof, the cylindrical telescoped portions of said hubs being rigidly bonded together to provide an integral assembly, each of said hubs having a cut-away portion opening outwardly at the ends thereof opposite said face flanges, one of said cut-away portions being in the form of a V-shaped opening and the other being in the form of a V-shaped projection with adjacent open spaces, said cut-away portions being in superposed alignment to define a pair of intersecting inclined slots extending through the hubs transversely between said flanges and forming a V-shaped opening, said V-shaped opening transecting angles of about 45° with respect to the longitudinal axis of said hubs and forming an included angle of about 90° therebetween, the apex of said V-shaped opening terminating in a radial slot extending through the surface of one of said face flanges.

3. A reel construction comprising a pair of hollow cylindrical hubs telescoped in closely adjacent concentric relation one within the other, said hubs having face flanges positioned at opposite ends thereof, the cylindrical telescoped portions of said hubs being rigidly bonded together to provide an integral assembly, each of said hubs having a cut-away portion opening outwardly at the ends thereof opposite said face flanges, one of said cut-away portions being in the form of a V-shaped opening and the other being in the form of a V-shaped projection with adjacent open spaces, said cut-away portions being in superposed alignment to define a pair of intersecting inclined slots extending through the hubs transversely between said flanges and forming a V-shaped opening, said V-shaped opening transecting angles of about 45° with respect to the longitudinal axis of said hubs and forming an included angle of about 90° therebetween, the apex of said V-shaped opening terminating in a radial slot extending through the surface of one of said face flanges, said radial slot having an inner terminal end positioned radially inwardly from the point of communication with the apex of said V-shaped opening and having an outer terminal end providing an opening at the periphery of said one-faced flange.

4. A reel construction formed of moldable plastic material and comprising a pair of hollow cylindrical hubs telescoped in closely adjacent concentric relation one within the other, said hubs having face flanges positioned at opposite ends thereof, the cylindrical telescoped portions of said hubs being rigidly bonded together to provide an integral assembly, each of said hubs having a cut-away portion opening outwardly at the ends thereof opposite said face flanges, one of said cut-away portions being in the form of a V-shaped opening and the other being in the form of a V-shaped projection with adjacent open spaces, said cut-away portions being in superposed alignment to define a pair of intersecting inclined slots extending through the hubs transversely between said flanges and forming a V-shaped opening, said V-shaped opening transecting angles of about 45° with respect to the longitudinal axis of said hubs and forming an included angle of about 90° therebetween, the apex of said V-shaped opening terminating in a radial slot extending through the surface of one of said face flanges, said radial slot having an inner terminal end positioned radially inwardly from the point of communication with the apex of said V-shaped opening and having an outer terminal end providing an opening at the periphery of said one-faced flange.

References Cited in the file of this patent

FOREIGN PATENTS 696,068 Germany -------------- Sept. 10, 1940